March 11, 1947. E. L. MACK 2,417,207
SEPARABLE FASTENER RECEPTACLE WITH PRECOMPRESSED SPRING
FOR AIRPLANE COWLINGS OR THE LIKE
Filed May 10, 1943
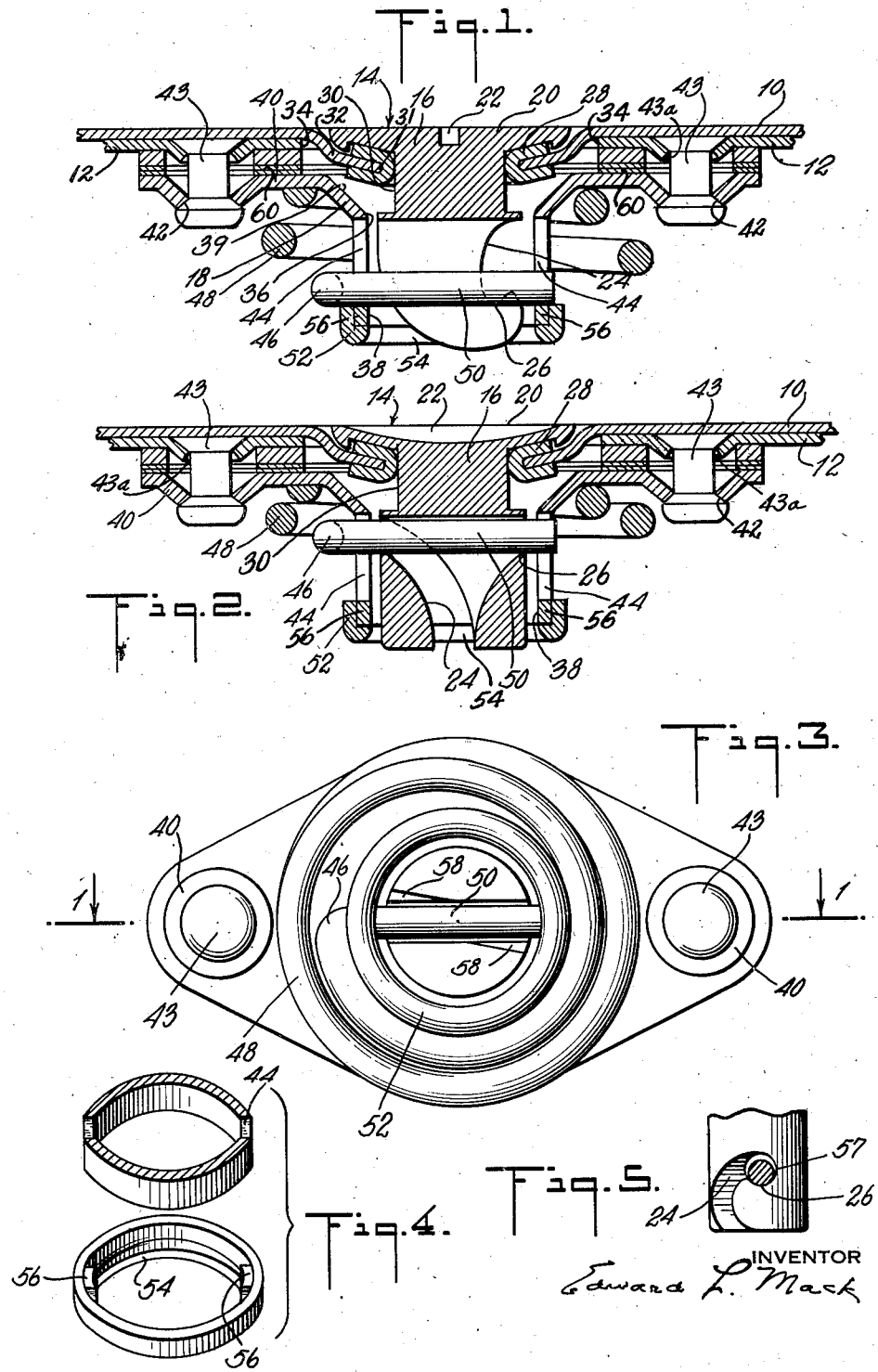
INVENTOR
Edward L. Mack Patented Mar. 11, 1947

2,417,207

UNITED STATES PATENT OFFICE 2,417,207

SEPARABLE FASTENER RECEPTACLE WITH PRECOMPRESSED SPRING FOR AIRPLANE COWLINGS OR THE LIKE

Edward L. Mack, New York, N. Y.

Application May 10, 1943, Serial No. 486,334

10 Claims. (Cl. 24—221)

This invention relates generally to a new and improved fastening device adapted for detachably fastening together two separate parts or sheets of material, and the invention particularly relates to an improved airplane cowling fastener, or fastener adapted to serve in a related manner for holding readily detachable sheet metal parts in close proximity under spring tension, and this invention relates to improvements in that class of fastener described and claimed in my U. S. Letters Patent 2,295,488, 2,306,967, and 2,317,787, issued September 8, 1942; December 29, 1942; and April 27, 1943, respectively.

A general object of the invention is to provide a fastener of this type which has a minimum of simplified parts, which is economical to manufacture and to assemble, which also may be easily and efficiently applied in place upon the parts to be fastened by modern manufacturing practices, and wherein the fastened parts are quickly detachable and then replaceable to prior fastened position with little effort and simple tools.

An important and particular object of the invention is an arrangement of parts in such a fastener which provides a receptacle having a pre-loaded or precompressed spring, so that the fastener parts may be fastened with a less amount of work, and if desired, with a less amount of stud rotation.

A further important object of the invention is an arrangement of parts in such a fastener which permits the use of two parts from economical metal stampings and a relatively economical barrel spring, to be associated preferably by spot welding to provide an efficient and cheaply manufactured receptacle member.

A further object of the invention is to provide a receptacle member having a precompressed spring member with two metal stampings so connected as to provide in one unitary member plate attachment means, spring holding means, spring guiding means, and locking-member travel-limit means.

A further object of this invention is to provide a receptacle for such a fastener which includes a locking-member for cooperation with a rotatable slotted stud, the said locking-member being held captive under spring tension in two oppositely disposed slots, which latter hold the said locking-member within sharply defined critical limits of travel.

A further object of the invention is an easy and economical method of assembly for the parts preferably by welding, which eliminates ordinary holding means otherwise necessary to hold the spring member.

An important object of the invention is the provision of a precompressed spring in such receptacle means, thereby permitting the use, if desired, of shorter studs than otherwise could be normally used without such precompressed springs.

It is a further object of this invention to provide a receptacle member in such a fastener which includes fiber shims adapted to permit the use of one particular standard size of fastener with a predetermined range of varied sheet thicknesses for such size of fastener.

It is a further important and particular object of this invention to provide such receptacle means in a compact form thereby affording important economies of space, and also to arrange such receptacle means so that the same does not snag cleaning cloths or wearing apparel of mechanics.

With the above and other objects in view, my invention will be readily understood from a particularly preferred illustrative embodiment hereinafter described in connection with the accompanying drawing which, it is to be understood, may be varied and is not to be deemed as limiting the scope of my invention.

In the figures:

Fig. 1 is a section of a fastener embodying my invention with the parts in operative position but not in interlocked position.

Fig. 2 is a section similar to Fig. 1 with the fastener parts in interlocked position.

Fig. 3 is a plan view of the fastener illustrated in Fig. 1.

Fig. 4 is a fragmentary perspective, partly in section, of the bottom part of the receptacle of the fastener, with parts in exploded relation, and unconnected.

Fig. 5 is a fragmentary section of the locking-member seated in its locking seat.

The embodiment of my invention shown in the above-identified figures may be said to diagrammatically illustrate the connection of two plate or sheet members 10 and 12 of an airplane cowling assembly which it is desired to hold in close proximity and relatively fixed position under spring tension by means of a fastener or coupling generally indicated as 14.

The fastener 14 comprises two main parts, namely a rotatable stud member 16 and a cooperative receptacle member 18 for detachable interlocking engagement therewith.

The rotatable stud member will normally be provided with a flat head member 20 having therein a slot 22 so that the stud member 16 may be rotated by means of a coin or screw driver or other tool being inserted in slot 22. Also stud member 16 will be provided on its opposite end, preferably by a simple milling operation, with a spiral slot 24, ending as indicated in a locking seat or detent 26. The stud member 16 may be rotatably connected to sheet 10 by a grommet 28 or other suitable fastening means, in such fashion that the outer portion of stud head 20 will be approximately flush with the outer portion of member 10. Also grommet 28, as shown, will normally be slidably engaged in reduced portion 30 of the shank of stud 16.

As is well understood in the art, sheet members 10 and 12 will be provided with the necessary registering holes 31 and 34 by means of conventional punch mechanisms, and downwardly angulated flange member 32 will be provided in sheet member 10 by conventional die mechanisms associated with said punch mechanisms.

Cooperating with rotatable stud member 16 is the receptacle member 18 which will normally be formed as indicated with a main body or collar portion 36 of generally cylindrical shape provided with a central axial opening or bore 38 and preferably having its upper internal and external longitudinal walls generally tapered or formed in the shape of an inverted truncated cone as at 39 as shown in Fig. 1.

The upper portion of receptacle 18 will ordinarily be provided with a flat or horizontal integral flange or base portion 40 having rivet holes 42 stamped therein thus permitting receptacle 18 through its flange or base 40 to be securely riveted by rivets 43 to plate member 12 through holes 43a in the latter.

As indicated, cylindrical portion 36 will normally be provided with two oppositely disposed and equally sized slots 44, and it will be understood that cylindrical portion 36 and its transverse base portion 40 can be made quickly and easily from an integral metal stamping by modern manufacturing practices.

Preferably a spiral barrel spring 46 will normally be coiled around cylindrical portion 36 with its intermediate and larger coil 48 disposed between base portion 40 and the bottom of cylindrical portion 36, and spring 46 when not compressed (i. e., when the spring is in place but not so held in final assembly by ring member 52) will normally have a greater length than the distance from flange 40 to the bottom of cylindrical portion 36. Lower spring end 50 will normally be inturned to extend transverse the core of the spring 46 as indicated, and will extend through slots 44, when the receptacle member 18 is assembled.

When assembled, spiral spring 46 will normally be preloaded or precompressed with considerable pressure and with its end 50 held captive in slots 44 by ring member 52 which latter has an inwardly turned horizontal flange 54 and two downwardly turned tabs 56. Tabs 56 will normally fit into the bottom of slots 44, thus centering ring 52 and providing a greater bearing surface for spring 46. Ring 52 will be preferably welded in place upon the lower part of cylindrical portion 36, by welding apparatus so arranged that the barrel spring 46 may be slipped over cylindrical portion 36, compressed there in place with the ring 52 therebelow, and with the welding operation thereafter completed. This makes for ready and economical assembly and avoids any holding tabs for the upper portion of spring 46, such as indicated in my Patents 2,295,488 and 2,306,967 hereinabove identified more fully, and also preloads or precompresses the spring before the stud 16 and the receptacle 18 are placed in interlocked relation. As illustrated in the drawings, ring 52 may have a larger external diameter than the internal diameter of the lower coil of spring 46. The inturned end of spring 46, identified as 50, operates as a locking-bar.

Those skilled in the art will recognize that the ring alternately may be spun or clinched in place, or many be replaced by other expedients, such as by a metal forming operation to close the ends of the slots, or as by a separate floating cross-bar having means at its ends to hold it within closed slots in portion 36 as described in my copending application 473,580, filed January 26, 1943, and they will also recognize the desirability of precompressing the spring in such forms.

Locking-bar or cross-bar member 50 of spring 46 will normally ride in said slots 44, thereby preventing the rotation of said spiral spring 46 and holding the main body of the spring compressed to a predetermined amount and in predetermined position.

With the parts arranged as shown in Fig. 1, rotation of stud 16 will cause locking-member 50 to ride upwardly in slot 24 of stud 16 and continued rotation will result in the deposition of the locking-bar member in detent 26, in which position raised portion 57 (Fig. 5) will ordinarily operate as a stop to prevent continued rotation of the stud member, and therefore the two cooperating fastener parts 16 and 18 will be held in firm detachable interlocking connection under spring tension, with the parts in the general relationship as indicated in sectional Figs. 2 and 3.

As will be apparent from a viewing of Fig. 1, the bevelled or angulated flange member 32 may materially cooperate with a marginal portion of the opening in plate 12 to operate as a centering means for associating the two main parts of the fastener both when the parts are to be fastened together and also as a bevelled centering means and bearing surface to overcome lateral stresses and vibratory movements of the fastener with the parts interlocked and with the cowling subjected to the movements attendant to its normal uses.

Preferably the entrance of spiral slot 24 will be considerably chamfered and camming surfaces indicated as 58 will normally be provided so that if the slot of the stud is not aligned with locking-bar 50, that contact of the latter with the cams 58 may slightly rotate the stud to align the same and to facilitate the locking cooperation of the fastener members. Also tolerances of sheet thicknesses may be provided by shims 60, and by varying the length of the stud.

With the parts as arranged, it will be realized that since the lower, or outer portion of spiral slot 24 has a steeper cam surface, than the innermost portion of said spiral slot just before the detent 26, that less work is required to seat the locking-bar in detent 26 with the spring 46 precompressed, than otherwise; also since the length of the track may be shortened, less rotation of the stud is necessary.

Furthermore, it will be recognized that the above disposition of parts permits a nice adjustment for limiting the travel of parts 10 and 12, as the load may first be assumed by the spiral spring 46, and later, if parts 10 and 12 separate further, the full load is taken up by substantially non-flexible parts by virtue of impingement of locking-member 50 against the upper ends of slots 44.

It will be recognized that the particular embodiment of my invention, above described, is illustrative only and that substitution of materials and parts or reversals of parts may be made without avoiding the scope of my invention which is defined in the following claims and it will be particularly recognized by those skilled in the art that the principles of my invention may be applied to the cross-bar, as well as slotted, rotatable stud type of separable fastener and that the appended claims read thereon.

I claim:

1. In a detachable fastener for maintaining two parts in close proximity under spring tension of the type employing a rotatable stud member and a cooperating receptacle member; a receptacle member which includes a main body portion having two oppositely disposed slots, precompressed tension means associated with said main body portion and positioned intermediate the bottom and top thereof, and a locking-member located in said slots and adapted to ride upwardly and downwardly in said slots influenced by said tension means, said locking-member being adapted for locking cooperation with the rotatable stud member.

2. A structure as defined in claim 1 wherein a ring member is associated with said main body portion in the lower part thereof, the said ring member closing the bottom of said slots, thereby to hold the locking-member captive in said slots.

3. A structure as defined in claim 1 which additionally includes a ring member welded to the lower portion of said main body portion adapted to close the bottoms of said slots.

4. A structure as defined in claim 1 wherein said tension means includes a spring closely encompassing said main body portion, a ring member for holding the locking member in said slots, and means for holding the ring in fixed relation with the main body portion.

5. A structure as defined in claim 1 wherein said tension means includes a barrel spiral spring, having intermediate coil larger than its other coils.

6. A structure as defined in claim 1 wherein said tension means includes a spring associated with said body portion and having an inturned end portion riding upwardly and downwardly in said slots, said inturned portion serving as said locking-member and means for holding said spring precompressed with said end portion maintained within said slots.

7. A structure as defined in claim 1, wherein said tension means includes a spring when uncompressed of greater length than the length of said main body portion, which spring in normal assembly will be precompressed and means for holding the locking member in the slots.

8. A structure as defined in claim 1, wherein said tension means includes a spiral spring when uncompressed of greater length than the length of said main body portion, which spring in normal assembly will be precompressed; and which further includes a ring member fastened to the lower part of said main body portion and closing said slots and adapted for maintaining said spring under tension.

9. In a detachable fastener for maintaining two parts in close proximity under spring tension of the type employing a rotatable stud member and a cooperating receptacle member; a receptacle member which includes a main body portion having a generally cylindrical form, two oppositely disposed closed slots in said main body portion, precompressed tension means associated with said main body portion and attached to said latter, and a locking-member in association with said tension means adapted to ride upwardly and downwardly in said slots held captive therein influenced by said tension means, said locking-member being adapted for locking cooperation with the rotatable stud member.

10. In the receptacle of a rotating stud type of detachable fastener which latter comprises a stud and a receptacle adapted for interlock under spring compression: a base member, an outwardly extending hollow member associated with said base member having slots therein and adapted to encompass a portion of the stud, a precompressed spring member encompassing at least a portion of said hollow member, said spring member having one end thereof bearing against said base member, a locking-member riding upwardly and downwardly in said slots influenced by said spring member, and a member rigidly connected to said hollow member adapted to hold said spring member in precompression when the fastener is in unlocked position.

EDWARD L. MACK.

REFERENCES CITED

The following references are of record in the file of this patent:

UNITED STATES PATENTS

| Number | Name | Date |
|---|---|---|
| 2,295,488 | Mack | Sept. 8, 1942 |
| 2,306,967 | Mack | Dec. 29, 1942 |
| 2,239,125 | Summers | Apr. 22, 1941 |